(12) United States Patent
Quintana

(10) Patent No.: US 6,178,569 B1
(45) Date of Patent: Jan. 30, 2001

(54) TOILET OVERFLOW CONTROL

(75) Inventor: Richard Quintana, Westminster, CA (US)

(73) Assignee: Niccole Family Trust, Huntington Beach, CA (US)

( * ) Notice: Under 35 U.S.C. 154(b), the term of this patent shall be extended for 0 days.

(21) Appl. No.: 09/408,287

(22) Filed: Sep. 28, 1999

Related U.S. Application Data

(63) Continuation-in-part of application No. 09/294,757, filed on Apr. 19, 1999.

(51) Int. Cl.[7] .............................. E03D 11/02; E03D 11/18
(52) U.S. Cl. .................................. 4/427; 4/406; 340/620; 73/304 C; 137/392; 137/558
(58) Field of Search .................. 4/366, 367, 406, 4/415, 421, 427, 508, 325; 340/604, 605, 618, 620; 73/304 C, 304 R; 116/109, 227; 137/392, 558

(56) References Cited

U.S. PATENT DOCUMENTS

| | | | |
|---|---|---|---|
| 3,984,877 | * 10/1976 | Kirby | 4/661 |
| 4,203,173 | * 5/1980 | Morris et al. | 4/427 |
| 4,547,768 | * 10/1985 | Kulhavy | 340/620 |
| 5,305,475 | * 4/1994 | Jaeckels et al. | 4/325 |
| 5,731,758 | * 3/1998 | Suttlemyre et al. | 340/612 |
| 5,732,417 | * 3/1998 | Pondelick et al. | 4/427 |
| 5,940,899 | * 8/1999 | Mankin et al. | 4/427 |

* cited by examiner

*Primary Examiner*—Henry J. Recla
*Assistant Examiner*—Tuan Nguyen
(74) *Attorney, Agent, or Firm*—James G. O'Neill

(57) ABSTRACT

A flow control device for a toilet to prevent flooding upon obstructing of a waste outlet of a toilet bowl. The device includes at least one sensor assembly mounted on a rim of a bowl of a toilet or urinal to hold the sensor assembly in a predetermined position within the bowl. If water bridges contacts on the at least one sensor assembly, an electrical circuit is completed, and a solenoid is actuated to close a normally opened valve to shut off running water to the water tank of the toilet. A power source and a valve open alarm system are electrically connected to the at least one sensor assembly and the solenoid actuated valve.

8 Claims, 3 Drawing Sheets

TOILET OVERFLOW CONTROL

CROSS REFERENCE TO RELATED APPLICATION

This is a continuation-in-part of my co-pending application Ser. No. 09/294,757, entitled TOILET OVERFLOW CONTROL, filed Apr. 19, 1999.

BACKGROUND OF THE INVENTION

1. Field of the Invention

This invention relates generally to fluid control devices, and more particularly, to a device mounted in a conventional toilet for controlling overflow of water, if the waste outlet thereof is obstructed.

2. Description of Related Art

As homeowners and those who work in and around certain types of institutions, such as retirement homes, convalescent homes, and the like, are aware, toilet bowls may become blocked for any number of reasons, and a person who repeatedly flushes such a toilet will cause it to flood. This flooding may cause serious problems, particularly in institutions, such as homes for the aged, since older people may slip and fall, or be subjected to diseases by such flooding waters.

Many patents have disclosed mechanical and electrically controlled water overflow devices to prevent the overflowing of toilets. Examples of such patents include U.S. Pat. No. 1,090,200 to Cole, U.S. Pat. No. 3,928,874 to Albertson, U.S. Pat. No. 3,987,502 to Hartmann, U.S. Pat. No. 4,041,557 to Ringler, U.S. Pat. No. 4,195,374 to Morris et al., U.S. Pat. No. 4,203,173 to Morris et al., U.S. Pat. No. 4,258,444 to Orszullok, U.S. Pat. No. 5,731,758 to Suttlemyre et al., U.S. Pat. No. 5,732,417 to Pondelick et. al., U.S. Pat. No. 3,908,204 to Hopkins and U.S. Pat. No. 4,985,944 to Shaw. These patents show that a system that detects the rise of water in a toilet bowl to a preset high-level, and then signals a valve unit to cause it to close and prevent further water delivery to the toilet system is old and well-known in the art. However, these patents tend to be complicated and expensive, and fail to disclose or teach a low-cost and simple device that is inserted in or near a rim of a toilet bowl to provide a sensor in the bowl at a selected level to sense the level of water and operate a solenoid valve to stop water flow. Furthermore, these patents fail to teach a system incorporating an easily and conveniently positioned water sensor, together with a warning-sounding alarm speaker or LED, and a low-voltage, rechargeable battery for energizing the system, as specifically disclosed in the operating system of the present invention.

A further U.S. Pat. No. 5,940,899 to Mankin et al. ("'899") is drawn to a system for preventing toilet overflow. The '899 patent includes a sensor (14), which is securely attached to the exterior of a toilet bowl (12). The sensor (14) is connected to a processor (16) to operate a valve (18) via a drive assembly (20). The sensor (14) includes a timer chip (U1) electrically connected to capacitor plates (22) in a housing (24), to produce a pulse train of variable frequency that is output to processor (16). Furthermore, the drive assembly (20) is composed of a DC drive motor (46) and a reduction gear train (48) to operate the valve (18). This '899 patent is felt to provide a system which is too complicated and expensive, and which is not as versatile as the system of the present invention, having a solenoid actuated valve and alarm system therein.

As stated above, the prior art devices tend to be complicated, while the present invention provides a simple and easy-to-use device which is easily installed in a toilet to prevent overflow in a more expeditious and cheaper manner.

SUMMARY OF THE INVENTION

Accordingly, it is a general object of the present invention to provide an improved and simplified overflow control device. It is a particular object of the present invention to provide an improved and simplified overflow control device, which is easily built into a toilet or urinal. It is yet another particular object of the present invention to provide an improved and simplified system, having one or more detecting sensors inserted in the rim of a toilet bowl or urinal and connected to a solenoid-operated valve means connected in a water line to the toilet bowl or urinal. It is yet another particular object of the present invention to provide an improved and simplified overflow control device having a plurality of sensing means attached at a rim of a toilet bowl or urinal and which is electrically connected to a normally open solenoid valve means for controlling the flow of water to the toilet bowl or urinal. And, it is still another particular object of the present invention to provide an improved and simplified flow control device having a battery-operated solenoid valve means, connected to sensors mounted at a rim of a toilet bowl or urinal, and which includes a warning sounding alarm speaker and/or an LED device to indicate closure of the valve means and a low-voltage, rechargeable battery pack for energizing the system.

These and other objects and advantages of the present invention are achieved by mounting at least one water level sensor in a rim of a toilet bowl or urinal and electrically connecting the at least one sensor to a solenoid-operated valve mounted in a water line for controlling the water flow to the toilet bowl or urinal. The device of the present invention may also have a warning-sounding alarm speaker and/or flashing LED connected to the solenoid to indicate that the solenoid has been actuated to close the valve, as well as a low-voltage, rechargeable battery pack for energizing the solenoid and alarm.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 1:
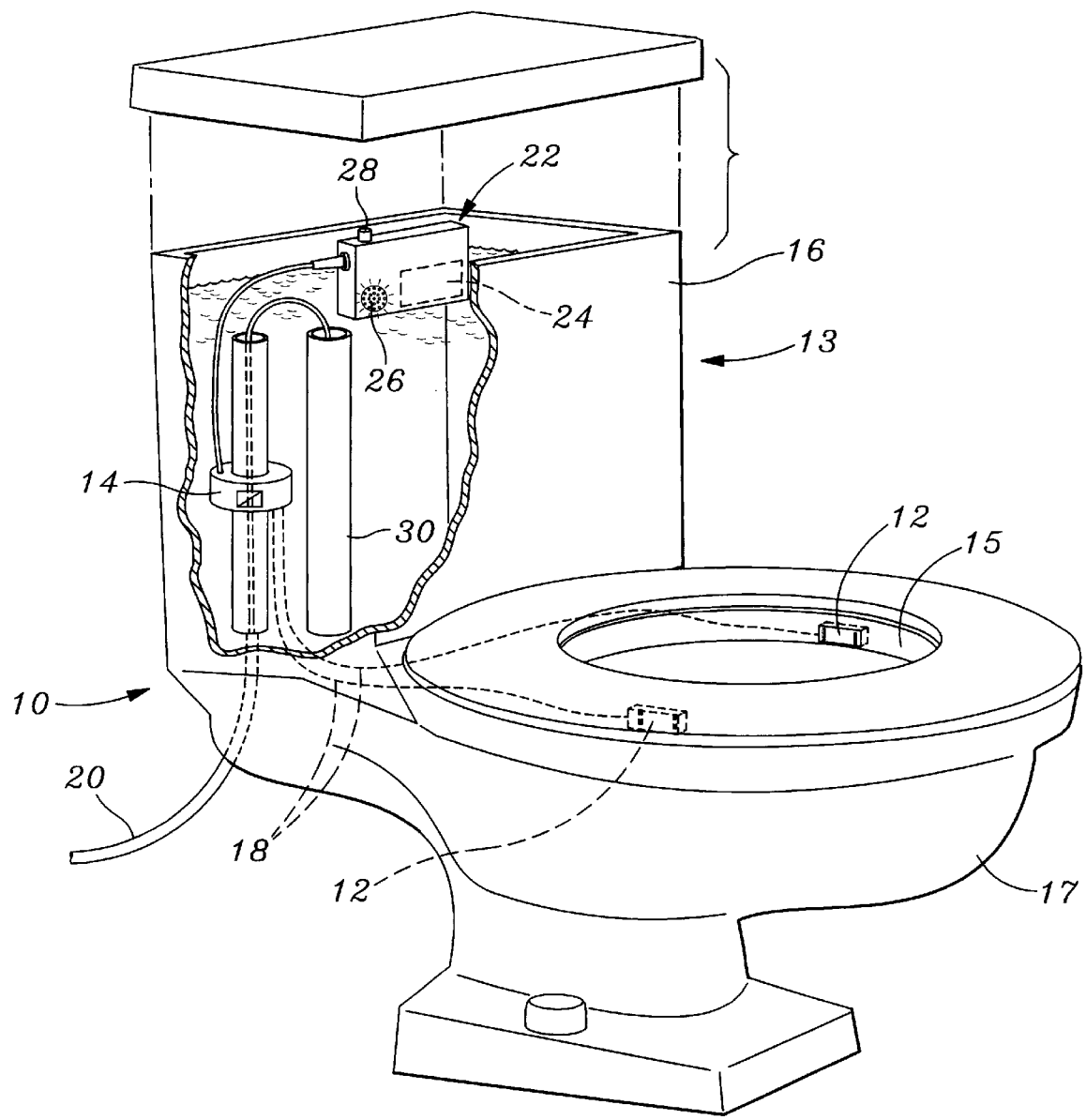
FIG. 1 is a perspective view of a toilet having a tank partially broken away showing a first embodiment of the flow control system of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved and simplified overflow control system 10 comprised of one or more water level sensors 12 and a solenoid-actuated or operated valve system 14. The sensors 12 are mounted in the rim 15 of a bowl 17 of a conventional or low-water-use toilet 13, having a water tank 16. The sensors 12 utilize normally open-switch elements therein, of the type set forth in Applicant's copending application Ser. No. 09/294,757, the disclosure of which is incorporated herein by this reference thereto. For example, the sensors 12 may have a pair of metallic contacts on either side of a spacing wall or element. The sensors 12 include a normally open switch, which will be closed when the water level in the toilet bowl 17 reaches a predetermined level and contacts the sensors. Upon the sensors 12 being closed, a circuit is completed through an electrical connection, such as wires 18 to actuate the solenoid operated valve 14 and close the normally open valve, in a known manner, so as to shut-off water flow from a water supply pipe 20 to the water tank 16 at the back of the toilet 13. The water supply pipe 20 usually includes a manually-actuated cut-off valve (not shown), of a known type.

As shown in FIG. 1, the solenoid-actuated valve system 14 is preferably mounted on the water supply pipe 20 within the tank 16, and is connected to a combination element of unit 22, which may be mounted inside or outside the tank 16. The combination unit 22 includes a valve closed alarm 26, a power supply 24 and a test button 28.

The solenoid-operated normally open valve system 14 and combination unit 22 are electrically connected together and may be powered by house current or by a 12 volt dc battery, which is rechargeable and held in the combination element. The alarm 26 may take any desired form, such as an LED or a speaker 26, or combination of both, so as to flash or sound an alarm to indicate that the solenoid has been actuated and the valve closed to stop the flow of water from water line 20 to the tank 16, because the water in the toilet bowl 17 has reached and activated the sensors 12. As mentioned above, the alarm 26 may consist of the speaker 26 to sound an alarm, and if mounted outside of the water tank 16 may be replaced or augmented by an LED light or indicator that will flash or provide a continuous light to indicate that the solenoid has been actuated, the valve is closed and that water flow to the toilet bowl 17 is shut off.

Once any blockage in the outlet of the toilet bowl 17 is removed, and the water in the toilet bowl 17 falls below the level of the sensors 12, the circuit will be opened, the solenoid operated valve 14 will be opened, and water will again flow from supply pipe 20 to the toilet tank 16, so that the toilet may be used again in a normal manner.

Figure 2:
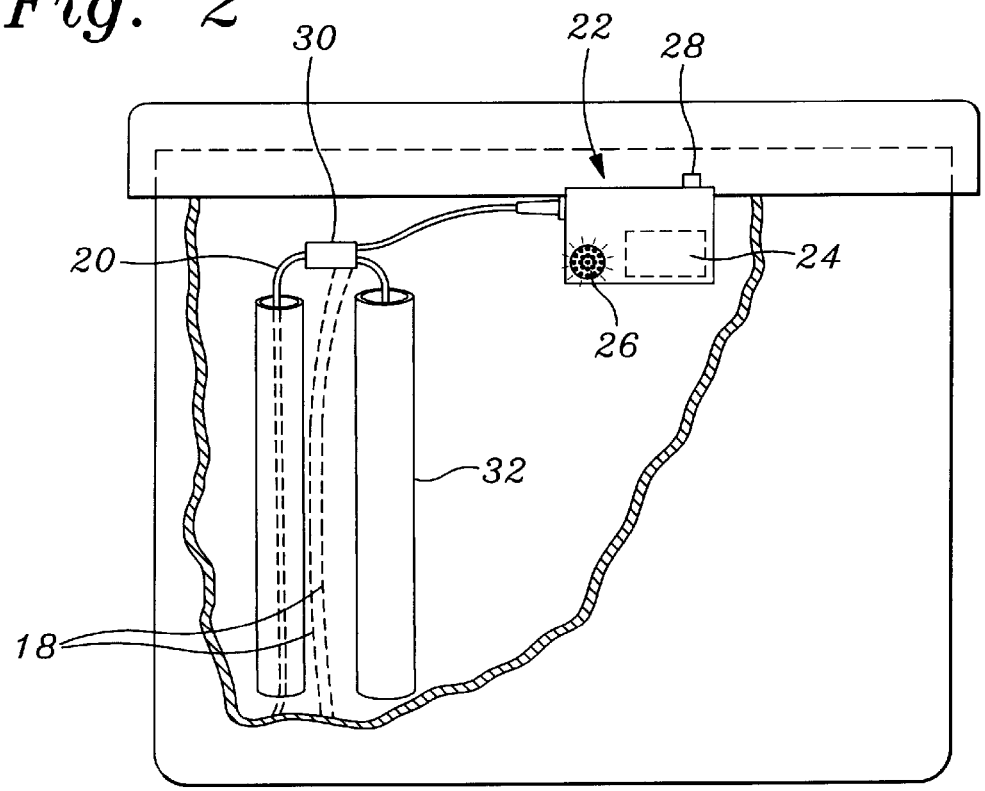
FIG. 2 is a front elevational view of a toilet tank, partially broken away, showing a second embodiment of the flow control system of the present invention.
Figure 3:
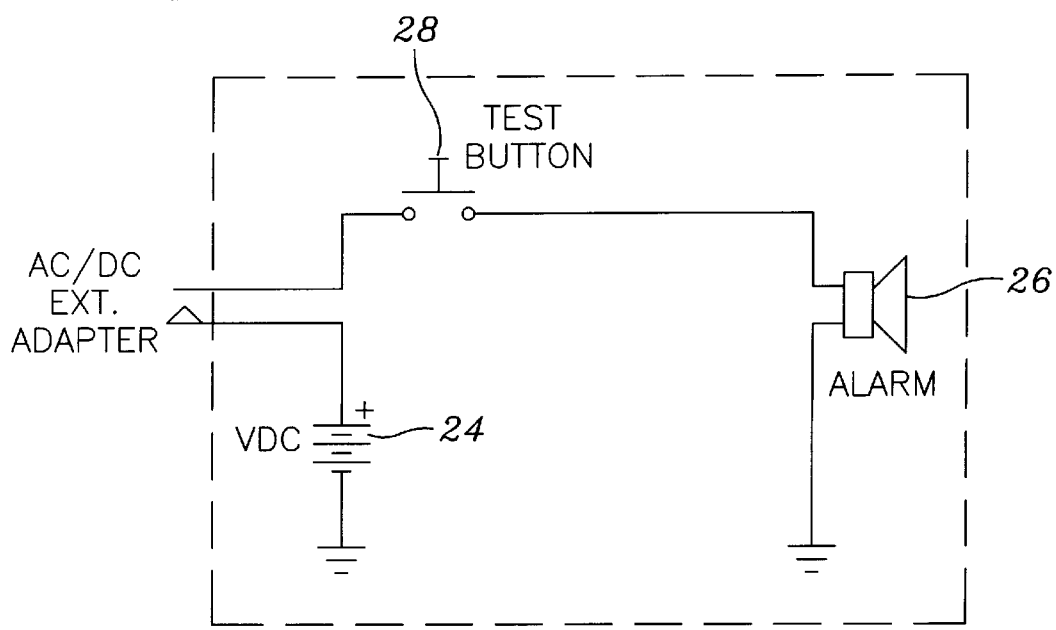
FIG. 3 is a schematic diagram of a preferred embodiment of the circuitry for a valve closed alarm, test button and power supply of the present invention.

Turning now to FIG. 2, there shown is a second embodiment of the present invention, wherein the solenoid-operated normally open valve 14 is replaced by a solenoid-operated normally open valve 30 in the water supply line 20, immediately prior to the water pipe 32 connected to the toilet bowl. The solenoid-operated normally open valve 30 is connected to the combination unit 22, and the overflow control system of this embodiment operates in the same manner as described above.

Figure 4:
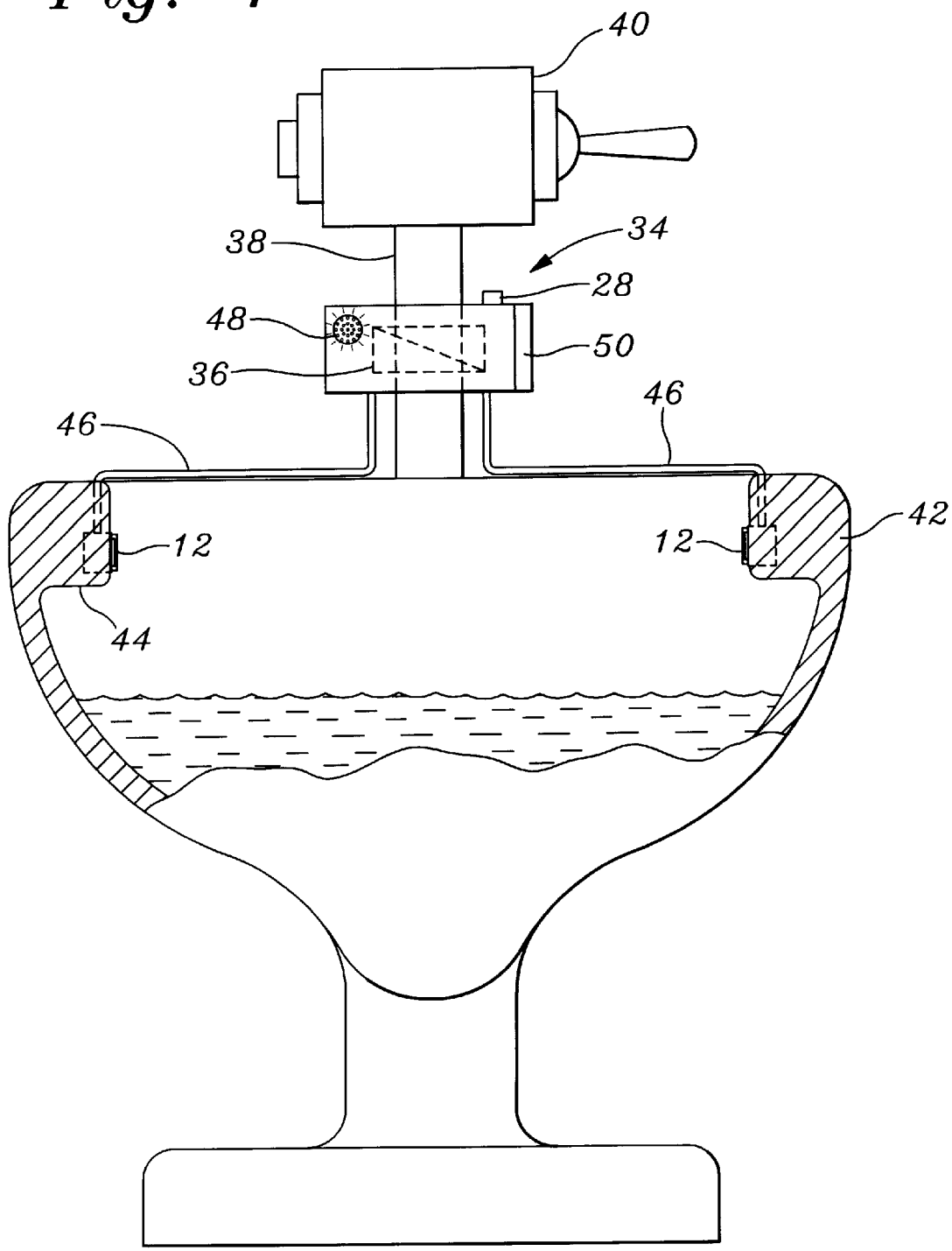
FIG. 4 is a front elevational view of a third embodiment of the flow control system of the present invention as mounted on a toilet or urinal.

A third embodiment of the invention is shown in FIG. 4, for use with toilets or urinals having no water tanks. In this embodiment, a unit 34, includes a solenoid-operated normally open valve unit 36 is mounted on or over a water line or supply pipe 38, directly connected between a flushing valve 40, such as a Sloan-type valve, and a toilet bowl or urinal 42. One or more sensors 12 are mounted in the rim 44 of the toilet bowl or urinal 42. The sensors 12 are electrically connected, as by wires 46, to the solenoid-operated normally open valve 36, whereby, if the level of the water in toilet bowl or urinal 42 reaches the sensors 12, the solenoid will be actuated to close the valve and stop water flow through water line 38.

The unit 34 also includes a test button 28, a speaker and/or LED 48, and a power supply 50, such as rechargeable battery, or a connection to house current. This third embodiment operates in the same manner, and produces the same results as the embodiments, described above.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A combination overflow control device and toilet, comprising:
  at least one sensor assembly mounted in a rim of a bowl;
  the at least one sensor assembly electrically connected to a solenoid-actuated, normally opened valve, a power supply and a valve closed alarm system; and
  the solenoid-actuated, normally opened valve is mounted in a water tank attached to the toilet, on a water supply line, adjacent a water line feeding to a bowl in the toilet.

2. The combination overflow control device and toilet of claim 1, further including a test button electrically connected to the power supply and the valve closed alarm system.

3. The combination overflow control device and toilet of claim 2 wherein the valve closed alarm system includes a speaker.

4. The combination overflow control device of claim 3, further including a light indicator connected to the speaker.

5. The combination overflow control device and toilet of claim 1 wherein the valve closed alarm system includes a speaker.

6. The combination overflow control device of claim 5, further including a light indicator connected to the speaker.

7. A combination overflow control device and toilet, comprising, in combination:
  the toilet including a bowl having a rim and water line feeding water into a water tank;
  at least one sensor assembly held in the rim, above a top surface of any water normally held in the bowl when an outlet from the bowl is not blocked;
  a solenoid-operated, normally opened valve, including an electrical power source, mounted on the water line to control the flow of water into the water tank; the solenoid-actuated, normally opened valve is mounted in the water tank connected to the toilet, on the water line leading into a further water line feeding water to the bowl;
  means electrically connecting the at least one sensor assembly and the solenoid-operated, normally opened valve; and
  a power source and an alarm having a speaker held in a unit electrically connected to the solenoid-operated, normally opened valve.

8. A combination overflow control device and a toilet, comprising:

a plurality of water level sensors secured in the rim of a bowl;

a solenoid-operated, normally opened valve electrically connected to a power source and a speaker to indicate that the solenoid-actuated, normally opened valve has been closed; the solenoid-actuated, normally opened valve mounted on a waterline to control the flow of water into a water tank; the solenoid-actuated, normally opened valve is mounted in the water tank connected to the toilet, on the water line leading into a further water line feeding water to the bowl; and a plurality of wires electrically connecting the plurality of sensors to the solenoid-operated, normally opened valve and the speaker.

* * * * *